3,104,469
ANALOG COMPUTER
Kay N. Burns and Warren A. Alexander, Tulsa, Okla., assignors to Jersey Production Research Company, a corporation of Delaware
Filed Sept. 18, 1959, Ser. No. 840,942
3 Claims. (Cl. 33—97)

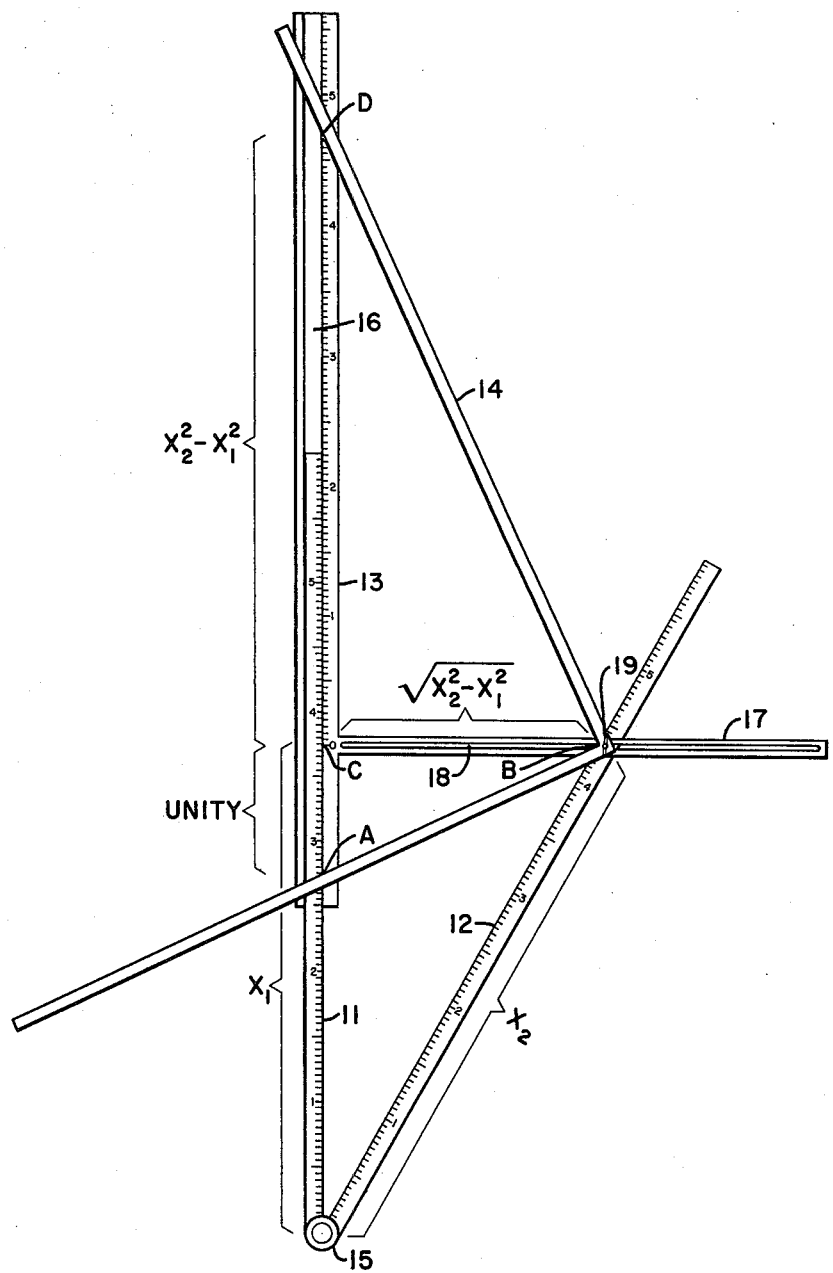

The present invention relates to analog computing methods and apparatus and more particularly relates to an analog device for rapidly determining differences between squared quantities. In a preferred embodiment, the invention relates to a series of interconnected scales which permit differences between squared quantities necessary for the preparation of seismic velocity profiles to be computed more rapidly and more conveniently than has been possible heretofore.

In analyzing and interpreting experimental data, it is often necessary to square two values and determine the difference between the squared quantities. Although this presents little difficulty where only a few sets of values must be handled or where a calculator or computer is available, the making of many such computations by arithmetic or slide rule can be a tedious, time-consuming task. One instance where this is particularly true is in the preparation of velocity profiles based upon information obtained during seismic prospecting. In making such profiles, differences between the squares of time intervals required for seismic impulses to reach various points on the earth's surface are plotted against distances between the points on the surface. Many different values must be squared and then subtracted from one another before the data can be plotted. This is often done in the field where calculators, computers, digitizers and similar devices are not available. Since charts, tables, and nomographs are not readily adapted for carrying out such computations, considerable time is generally required for preparation of the data to be plotted. Errors due to miscalculations are frequent. Similar problems are encountered in the use of statistical methods for the interpretation and analysis of data and in other situations where differences between squared quantities must be repeatedly determined.

The present invention provides a new and improved method and apparatus for rapidly determining the difference between the squares of two given quantities. In accordance with the invention, it has now been found that a mechanical linkage which permits the formation of two similar right triangles can be utilized to compute the difference between the squares of two given quantities in a fraction of the time necessary to carry out the computation by slide rule or arithmetic. By forming two similar right triangles so that a common leg represents the square root of the difference between the squares of the given quantities and letting the second leg of one triangle equal unity, the difference between the squared quantities can be found by measuring the second leg of the second triangle. The invention provides a series of interlinked scales from which the requisite triangles can be rapidly formed and on which the lengths of the legs of the triangles can be read directly. The use of such interlinked scales permits the difference between the squares of two given quantities to be determined without any mathematical computation and hence provides a faster, more convenient method for determining such differences than has been available heretofore.

The exact nature and object of the invention can be best understood from the following detailed description of a device for determining the difference between the square of two quantities in accordance therewith and from the accompanying drawing which illustrates one embodiment of such a device.

The analog computing device of the invention depicted in the drawing comprises members 11, 12, 13 and 14. These members may be constructed of metal, plastic, wood, or other suitably rigid material. Members 11 and 12 are interconnected at joint 15 and provided with graduations to permit the measurement of distances along their lengths. In the particular embodiment shown in the drawing, these graduations start with zero at the pivot point and extend about six units along each member. The graduations are used to represent the numbers to be squared by means of the computing device and hence the particular range selected for the graduations will depend largely upon the type of data with which the device is to be used. Since time intervals between the detection of impulses during seismic prospecting seldom if ever exceed about four seconds, a range from zero to about six on members 11 and 12 as shown will be satisfactory for use in preparing seismic velocity profiles. Larger or smaller ranges may be more suitable for use in determining differences between squared quantities for other purposes. Regardless of the range employed, the graduations on members 11 and 12 should start with zero at the pivot point and should be consistent.

As can be seen from the drawing, member 11 extends into groove 16 in the vertical leg of member 13. The two members are thus free to slide vertically with respect to one another. Member 13 has a crossarm 17 which extends perpendicular to member 11 and contains a longitudinal slot 18. The vertical leg of member 13 is graduated to indicate a distance of one unit below a zero point opposite crossarm 17. Above the zero point, the edge of the vertical leg of member 13 adjacent member 11 is graduated to correspond to the scale on members 11 and 12.

Member 14 is an L-shaped member which is attached to crossarm 17 by a bolt extending through slot 18 in the crossarm and secured by a wing nut 19. The bolt extends through member 14 at a point such that the apex of the right angle formed by the legs of the member falls opposite the zero point on member 13. The legs are of sufficient length to intersect member 13 when the apex of member 14 is at the extreme end of slot 18. Member 14 and crossarm 17 need not be graduated.

To determine the difference between the squares of two quantities, $x_1$ and $x_2$, by means of the apparatus shown in the drawing, the zero point on the vertical leg of member 13 is first set opposite the value $x_1$ on member 11. The quantity $x_2$ is then introduced by moving member 12 until the value $x_2$ on the scale of member 12 falls in the center of slot 18 in crossarm 17. This forms a first right triangle having the quantity $x_1$ as one leg and the quantity $x_2$ as the hypotenuse. The distance along crossarm 17 from the zero point adjacent member 11 to the edge of member 12 equals the square root of $(x_2^2 - x_1^2)$. To obtain the square of this quantity, member 14 is set on crossarm 17 so that the apex of the right angle formed by the legs of member 14 falls at the point of intersection of the edge of member 12 and the center line of crossarm 17. The lower leg of member 14 is set to intersect members 11 and 13 at the mark indicating a distance of one unit below the zero point on the vertical leg of member 13. The upper leg of member 14 will then intersect the vertical leg of member 13 at some point above the zero point thereon. Second and third similar right triangles having a common leg equal to the square root of quantity $(x_2^2 - x_1^2)$ are thus formed. These two similar triangles are indicated on the drawing as triangles ABC and BCD. In these two triangles, leg BC in triangle ABC is to leg CD in triangle BCD as leg AC in triangle ABC is to leg BC in triangle BCD. In other words, $$\frac{BC}{CD} = \frac{AC}{BC}$$

Rearranging the terms, $(AC)(CD) = (BC)^2$. Since the distance AC in triangle ABC was taken as unity and since $BC = \sqrt{x_2^2 - x_1^2}$, it follows that the distance CD must equal the quantity $(x_2^2 - x_1^2)$. By reading on the vertical leg of member 13 the distance above the zero point at which member 14 intersects the scale of member 13, this quantity can be obtained directly.

The use of the computing device of the invention can be further illustrated by referring to the settings of the scales in the apparatus shown in the drawing. The value of $x_1$ shown on the apparatus is 3.72, as indicated by the position of the zero point on member 13 with respect to the scale on member 11. The apex of member 14 is set opposite a value of 4.30 on the scale of member 12, representing $x_2$. Member 14 intersects the scale on the vertical leg of member 13 at a value of 4.65, which is the difference between $(4.30)^2$ and $(3.72)^2$. Similar results accurate to three places can readily be obtained with any combination of $x_1$ and $x_2$ values.

Many modifications in the specific apparatus herein described and illustrated in the drawing will be apparent to those skilled in the art. Components making up the apparatus may be arranged in a number of ways to permit the formation of similar right triangles having as a common side a distance equal to the square root of $(x_2^2 - x_1^2)$. It is therefore intended that the method and the apparatus of the invention be limited only by the scope of the following claims.

We claim:

1. Analog apparatus for determining the difference between the squares of two quantities which comprises two pivotally-connected scales linearly graduated along their lengths from the pivot point; a rectilinear cross-member extending at a right angle from one of said pivotally-connected scales to form a right triangle, said cross-member being movable along the longitudinal axis of one of said pivotally-connected scales, and an additional member having rectilinear arms extending at right angles to one another pivotally attached to said cross-member at the intersection of said cross-member with the other of said pivotally-connected scales.

2. An instrument for determining the difference between the squares of two numbers which comprises a first linear scale, a second linear scale pivotally connected to said first linear scale, a third scale adapted to slide adjacent to and parallel with said first linear scale having a cross-arm extending at right angles to said first linear scale, and an L-shaped member having its apex pivotally attached to said cross-arm at the intersection of said cross-arm with said second linear scale.

3. A device for determining the difference between the squares of two quantities which comprises a first adjustable right triangular figure having a first leg and an hypotenuse linearly graduated from the vertex of the included angle, a second adjustable right triangular figure having the second leg of said first right triangular figure as a first leg and having a second leg extending a distance representing unity along said first leg of said first right triangular figure, and a third adjustable right triangular figure having as one leg said second leg of said first right triangular figure and having an hypotenuse which intersects the hypotenuse of said second right triangular figure to form a right angle.

References Cited in the file of this patent

UNITED STATES PATENTS

| 1,491,048 | Kuehl et al. | Apr. 22, 1924 |
| 2,334,404 | Garrett | Nov. 16, 1943 |

FOREIGN PATENTS

| 366,933 | Germany | Jan. 13, 1923 |